GLASS REED RELAY SWITCHING MATRIX

Filed Aug. 24, 1964 5 Sheets-Sheet 1

INVENTOR
JOHN H. DEWITT, JR.

BY Cushman, Darby & Cushman
ATTORNEYS

INVENTOR
JOHN H. DEWITT, JR.
BY
Cushman, Darby & Cushman
ATTORNEYS

Sept. 2, 1969 J. H. DE WITT, JR 3,465,291

GLASS REED RELAY SWITCHING MATRIX

Filed Aug. 24, 1964 5 Sheets-Sheet 3

INVENTOR
JOHN H. DEWITT, JR.

BY Cushman, Darby & Cushman
ATTORNEYS

Sept. 2, 1969 J. H. DE WITT, JR 3,465,291

GLASS REED RELAY SWITCHING MATRIX

Filed Aug. 24, 1964 5 Sheets-Sheet 4

INVENTOR
JOHN H. DEWITT, JR.

BY Cushman, Darby & Cushman
ATTORNEYS

INVENTOR
JOHN H. DEWITT, JR.

BY Cushman, Darby & Cushman
ATTORNEYS

3,465,291
GLASS REED RELAY SWITCHING MATRIX

John H. De Witt, Jr., 3602 Hoods Hill Road, Nashville, Tenn. 37215

Filed Aug. 24, 1964, Ser. No. 391,633
Int. Cl. H04q 9/04
U.S. Cl. 340—166 3 Claims

ABSTRACT OF THE DISCLOSURE

A switching arrangement to permit the interconnection of a selected one of a number of input lines and a selected one of a plurality of output lines. The input and output lines are arranged in spaced relationship in a matrix to define cross-over points between the input and output lines. Reed relays, which may be selectively closed, interconnect the input and output lines at the cross-over points.

This invention relates to a cross-bar switcher device and more specifically to an improved solid-state switcher particularly useful in video applications.

A number of prior arrangements have been utilized in television studies, telephone offices and other complexes where it is necessary to connect by remote control any one of a multiplicity of input circuits to any one of a number of output circuits. From these applications there has developed a type of switcher equipment known as a cross-bar in which the inputs are fed to a number of parallel lines. Output lines are arranged at right angles to such input lines and means are provided at the cross-over points to connect the input and output lines. In the past, cross-bar switchers have suffered the disadvantages of low speed, undesirable cross-talk, poor electrical operating characteristics, etc.

The present invention overcomes prior arrangements by providing improved cross-over means to achieve rapid switching speeds and reliable operation thereby improving accessibility to various sources.

Another object of the invention is to provide a cross-bar switcher arrangement where cross-talk is reduced and the noise level is maintained below an objectionable level.

A further object of the invention is to provide cross-bar switcher equipment in which the necessity for balanced lines, compensating capacitors, and the like to insure stable operation are obviated.

Ancillary to the immediately preceding object, it is a further object of the invention to provide: an improved arrangement for maintaining a flat frequency and phase response characteristic regardless of the number of outputs connected to any one input; minimization of switching transients so that the sudden connection of other outputs to any one input will not affect the signal level at the other outputs already connected; constant phase shift through the unit regardless of which output is connected to which input; and low differential gain and phase characteristics through the unit in order to prevent distortion.

Further objects and the entire scope of the invention will become more fully apparent when considered in light of the following detailed description of an illustrative embodiment of this invention and from the appended claims.

The illustrative embodiment may be best understood by reference to the accompanying drawings, wherein.

The illustrative embodiment which will be hereinafter described in detail is a cross-bar switcher for use in video applications. Briefly, the arrangement comprises a plurality of input terminals to which the video signals are separately applied. Each input has associated therewith an input amplifier. The outputs of these amplifiers drive separate vertical input lines mounted on one side of a panel. Parallel metal bars are attached to the panel to define spaced channels within which the vertical input lines are located. These bars serve not only to separate the input lines, but also to electrically shield them from one another. On the opposite side of the panel a similar arrangement of output lines and metal bars is provided. However, this arrangement is horizontally oriented. Adjacent each cross-over point of the vertical and horizontal lines a hole is provided in the panel through which reed relays extend. One contact of each relay is connected to its associated input line and the other contact is connected through a resistor to its associated output line. The control windings of the reed relays are connected through appropriate switches to a power supply. The output lines are connected to the output amplifiers to raise the output signal to a desired level. When it is desired to connect a particular input signal to a selected output, the switch joining the power supply to the control winding of the reed relay at the crossover point between the appropriate input and output lines is actuated to close the relay contacts thereby completing the circuit.

As stated previously the cross-bar switcher which forms the illustrative embodiment is particularly adaptable to video applications. In the transmission of television signals it is necessary to carry frequencies ranging from 10 cycles per second to 10 megacycles per second or more depending upon the bandwidth used in the system. Such large bandwidths require a number of design considerations among which are:

(1) Minimizing of cross-talk between adjacent circuits.

(2) Maintaining a flat frequency and phase response characteristic regardless of the number of outputs connected to any one input.

(3) Minimizing switching time and switching transients so that the sudden connection of other outputs to any one input will not affect the signal level at the other outputs already connected.

(4) Achieving constant phase shift through the unit regardless of which output is connected to which input. This is particularly true in case of color transmission of video signals.

(5) Achieving low differential gain and phase characteristics through the unit in order to prevent distortion of color signals.

The foregoing considerations are dealt with by the arrangement which will now be described in detail.

Figure 1:
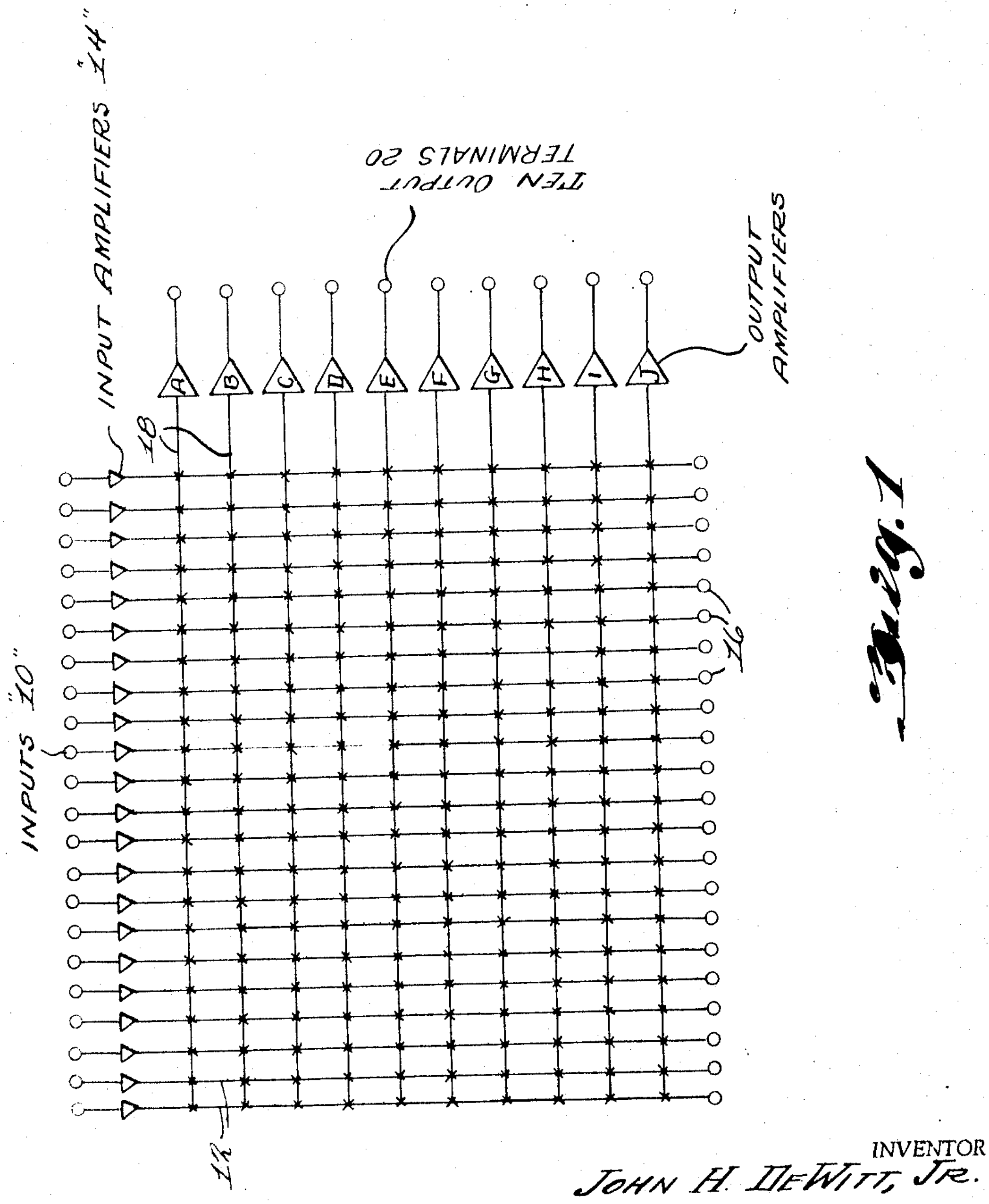
FIGURE 1 is a schematic electrical diagram of the signal path arrangement of the overall switcher arrangement.

Referring to FIGURE 1, the general arrangement of the cross-bar switcher will be set forth. A plurality of input terminals 10 are shown. In the illustrative embodiment twenty-two of these are provided. A separate input line 12 is joined to each of the terminals 10. In each input line an input amplifier 14 is inserted. The input lines are arranged in a vertical, spaced orientation. Each line is connected at its lower end to a terminal 16. Terminals 16 are provided to permit a tandem arrangement of cross-bar switcher units as will be described in greater detail hereinafter. A plurality of spaced, horizontally oriented output lines 18 are provided at right angles to lines 12. The input lines 12 and output lines 18 are interconnected at their cross-over points as indicated generally by X. In the illustrative embodiment ten output lines are shown and each is provided with an output amplifier, designated A–J respectively. These output amplifiers are joined to associated output terminals 20 from which the output signals are taken.

Figure 2:
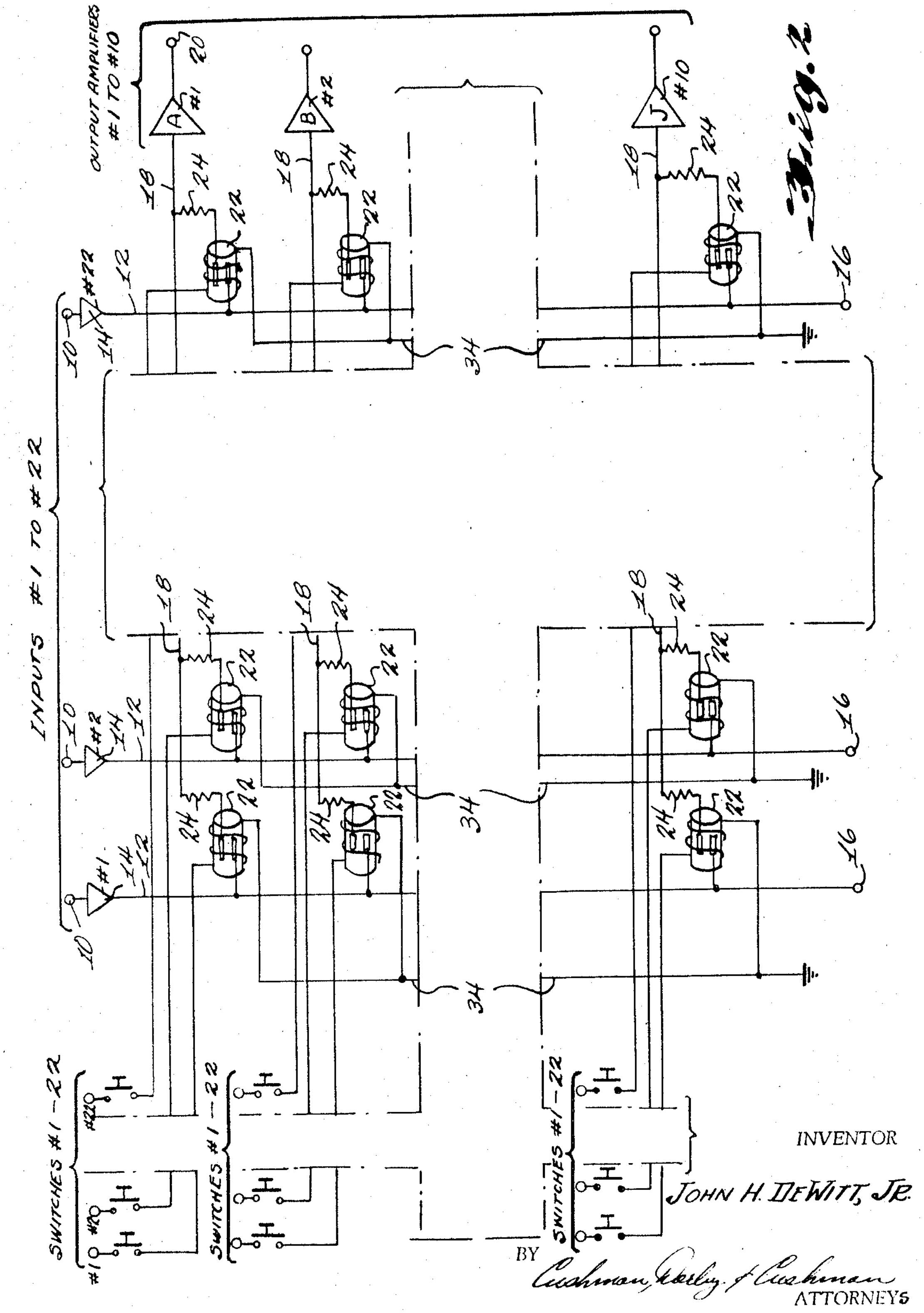
FIGURE 2 is a more detailed schematic diagram of the switcher illustrated in FIGURE 1.

FIGURE 2 illustrates in greater detail the arrangement described with respect to FIGURE 1. For convenience of illustration, portions of the detailed arrangement have been omitted and like elements have been identically identified in both figures. The cross-over points X is in FIGURE 1 have been more specifically illustrated as reed relays 22.

As can be observed from the drawing, each of the input lines 12 is connected to contacts of ten reed relays, the ten relays being respectively associated with outputs #1–#10. Other contacts of the relays 22 are connected through resistors 24 to the respective output lines 18. A group of twenty-two switches is associated with each of the outputs #1–#10. These switches may be located at any desired remote position. The individual switches of each group serve to selectively connect a power supply to the grounded coils which control the operation of the respective reed relays in the given output level. Thus, for example, the closing of switch #1 of the group of switches associated with output #1 level causes energization of the relay 22 which serves as the cross-over between line 12 of input #1 and line 18 of output #1. Consequently, the input signal on terminal 10 of input #1 is connected to terminal 20 of output #1. The switching speed of this operation is very fast due to the operating characteristics of the reed relay.

From the foregoing it can be appreciated that at any of the ten output positions, any of the twenty-two input signals may be connected. This is eccomplished by the actuation of the appropriate switch of the group of twenty-two associated with each output level. It will also be appreciated that a single input signal may simultaneously be connected to all ten outputs.

Although the basic operation just described is relatively easy to understand, the implementation thereof is extremely difficult in light of the considerations set forth above. The present invention is directed to an improved mechanical and electrical arrangement for a cross-bar switcher as will now be described in further detail.

Figure 3:
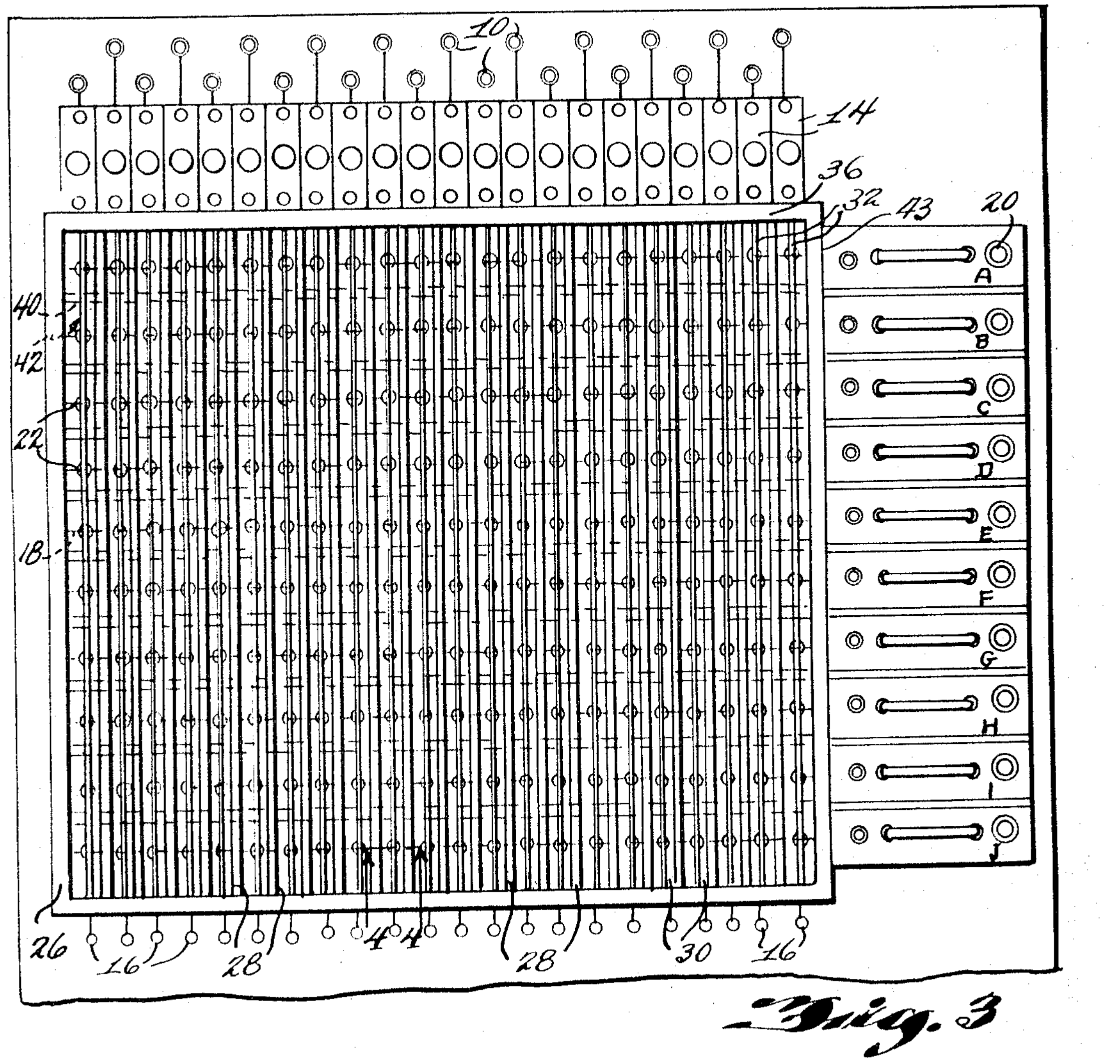
FIGURE 3 is a front elevation view of a rack-mounted switcher arrangement according to the invention.
Figure 4:
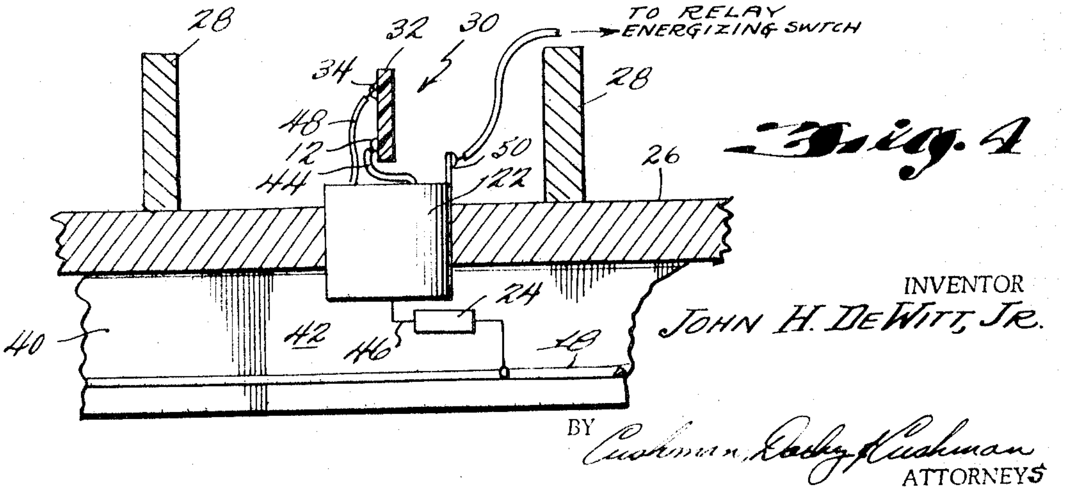
FIGURE 4 is an enlarged sectional view of a portion of the switcher arrangement taken along line 4—4 of FIGURE 3.

Referring to FIGURES 3 and 4, the physical arrangement of the switcher comprises a panel member 26 having on its front side a plurality of spaced, parallel vertically extending bars 28 defining channels 30 therebetween. A board 32, made of an insulating material such as epoxy, is positioned within each of the channels 30. Board 32 is supported by conventional means at its upper and lower ends and printed thereon are a pair of copper strips 12 and 34. These strips correspond to lines 12 and 34 in FIGURE 2. As can be appreciated from the latter figure, line 34 is grounded and line 12, which has a low surge impedance (approximately 30 ohms), is joined to the input amplifier 14. Amplifiers 14 are plugged into panel 26 at the top portion thereof and are separated from the elements on the lower portion of the panel by means of a horizontal bar 36. Bar 36, panel 26 and vertical bars 28 are metallic, preferably aluminum, and are grounded. Horizontal bar 36 serves to shield the amplifiers 14 from the remainder of the equipment and the vertical bars 28 shield the vertical input lines 12 from each other, both electromagnetically and electrostatically. Accordingly, unwanted currents induced by one line in another are kept at a level of approximately $\frac{1}{10}$ of 1 percent of the desired current in adjacent bars. By this arrangement, cross-talk is minimized.

On the opposite side of panel 26, a plurality of spaced, parallel horizontally extending bars 40 are provided to define channels 42. An output line 18 is suitably positioned within each of these channels 42. Lines 18 are connected to their respective output amplifiers A–J which are also plugged into the front surface of panel 26 at the side thereof and are shielded from the remainder of the panel by a vertical metallic bar 43.

At the cross-over point between each input line 12 and each output line 18, an aperture is provided in the panel 26 within which the miniature reed relay 22 is inserted. In FIGURES 3 and 4, these relays are shown as having a cylindrical case (which was omitted in FIGURE 2 to permit a more clear electrical presentation). Within each case there is a hermetically sealed reed unit with an actuating coil wound thereabout. A lead 44 from one of the relay contacts is connected to input line 12 and the other contact lead 46 is connected through the resistor 24 to the output line 18. One end of the actuating coil is connected by lead 48 to the grounded strip 34. The other end of this coil is joined to a tab 50 which is suitably connected to its associated relay energizing switch.

With the physical structure of the switcher now described, the electrical aspects thereof will be considered.

Figure 5A:
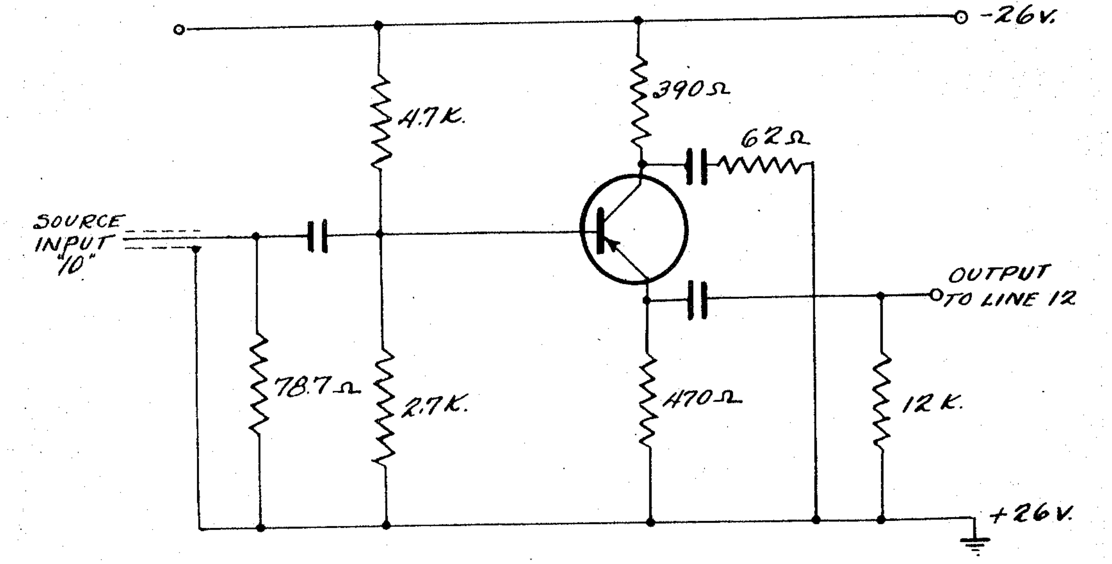
FIGURE 5A is a schematic electrical diagram of the input amplifier employed in the present invention.
Figure 5B:
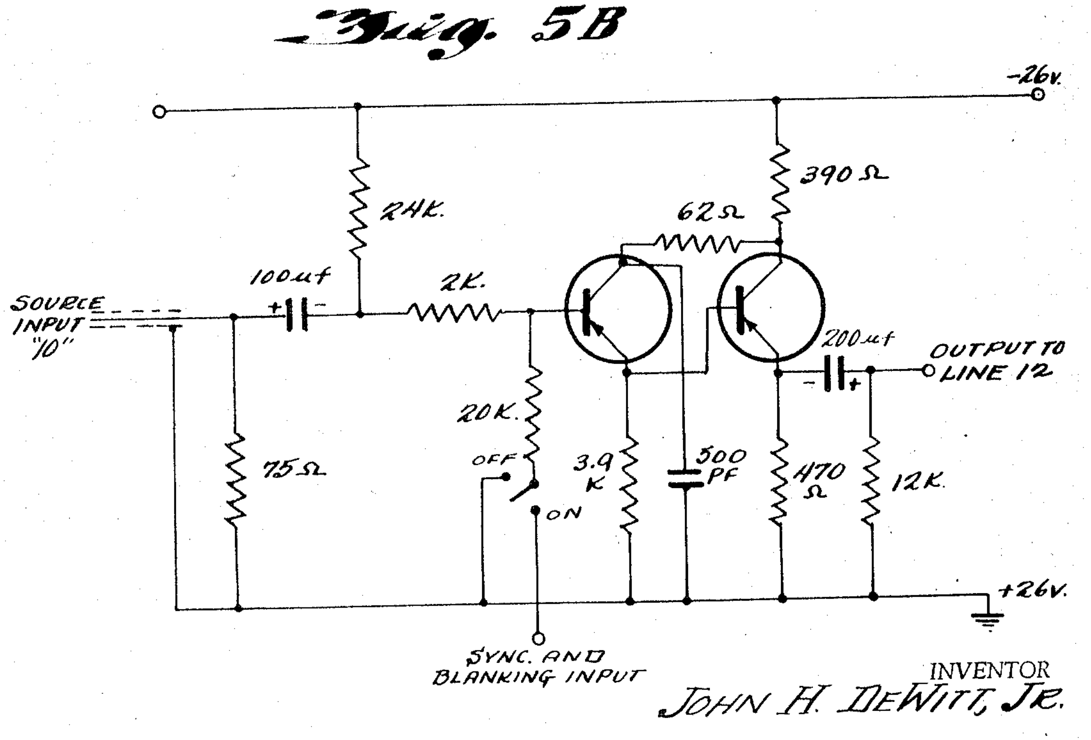
FIGURE 5B is a schematic electrical diagram corresponding to FIGURE 5A but further including provisions for adding synchronizing and blanking signals to a non-composite video signal which may be applied to the input terminal.

The input amplifiers which are employed with the present invention are shown in FIGURES 5A and 5B with suggested values indicated. The input amplifier in FIGURE 5B is utilized when it is desired to add synchronizing and blanking signals to a non-composite picture signal which may be present at the input.

As stated previously, with the present arrangement one input may be connected to the ten outputs. This can cause serious problems since the capacitance of the ten output lines is loaded on the one input. The capacitance of one output line is approximately 33 picofarads. Therefore, the total loading when ten output lines are bridged on one input line is 330 picofarads. This capacitance has a reactance of only about 50 ohms at 10 mc. Therefore, the impedance of the input must be low to avoid affecting the signal level thereon. By employing emitter follower transistors of the 2N1143 type (beta of approximately 40) and utilizing base resistances of approximately 75 ohms, the output resistances of amplifiers 14 are approixmately 2 ohms. Therefore, since input lines 12 have low surge impedance, excellent gain stability is realized.

An additional feature of the present input amplifiers is the use of blocking capacitors between the transistors and the outputs to lines 12. This eliminates the requirement for balancing out DC in order to prevent switching transients. By this arrangement, only alternating currents are present in the reed relays.

Figure 6:
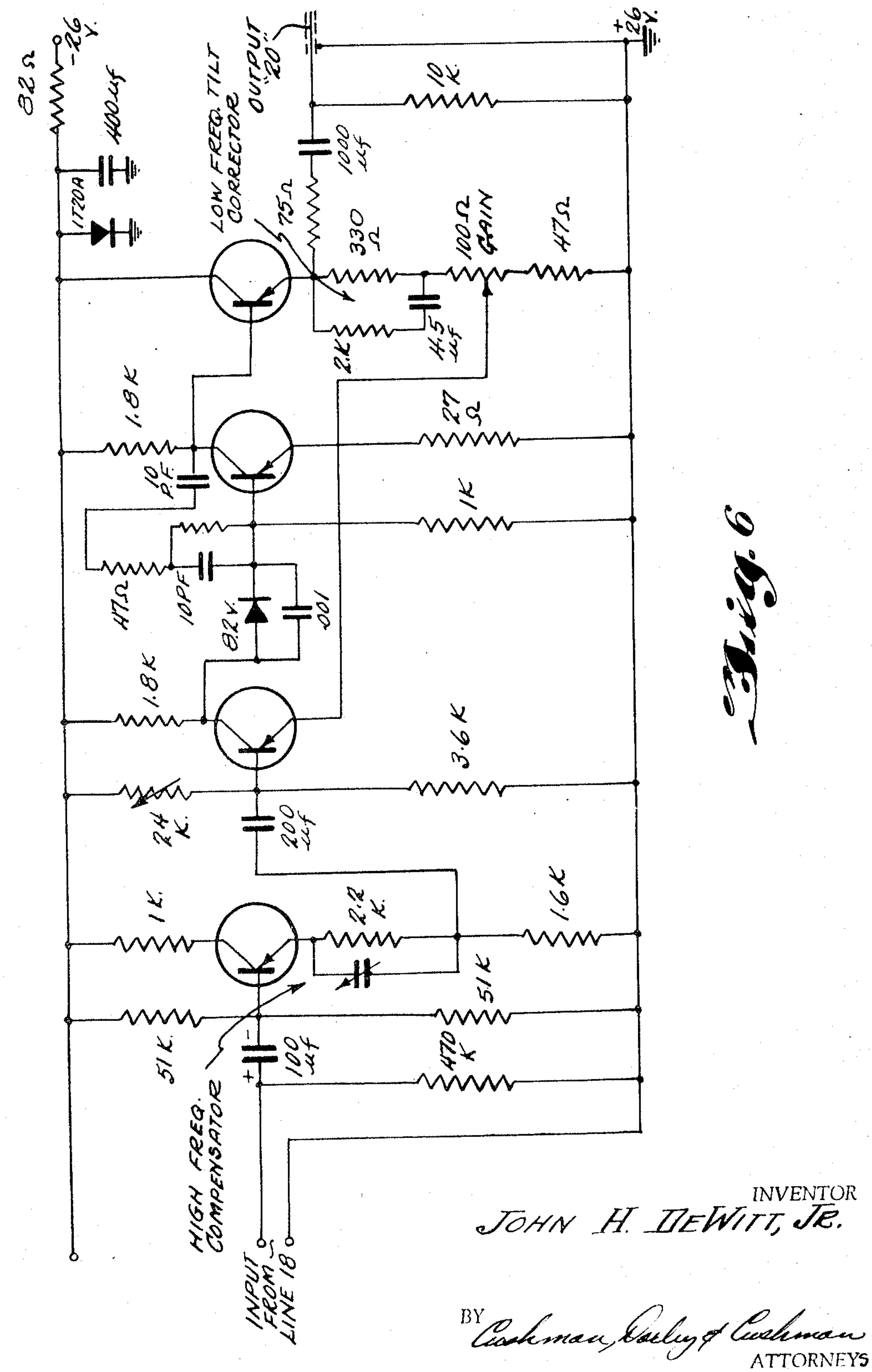
FIGURE 6 is a schematic electrical diagram of the output amplifier utilized in the illustrative embodiment.

In FIGURE 6 there is illustrated the output amplifier which is employed in the illustrative embodiment. Just as in the case of the input amplifiers, the output amplifier is completely transistorized, type 2N1143 transistors being employed. The input stage is an emitter follower with a resistance of approximately 4,000 ohms between its emitter and ground. The overall input resistance of this stage is approximately 20,000 ohms with low shunting capacitance. The balance of the amplifier consists of three stages which are DC coupled and in which overall degenerative feedback is used between the emitter circuit of the output transistor and the emitter circuit of the first stage. The use of degenerative feedback in this unit causes the amplifier to have very low distortion characteristics. The gain of the amplifier is set by the 100 ohm potentiometer in the feedback circuit and is normally adjusted so that the overall loss through the switcher from one input to any one output is zero.

The input impedance of each output amplifier 20 being relatively high (20,000 ohms) ten of them can be bridged across any one input without affecting the video voltage present on the input line 12 to any appreciable extent.

A more serious consideration has to do with the capacitance loading which takes place when a number of outputs are bridged on to one input. In fact, the most serious design consideration in this respect is the frequency and phase characteristic change between the two conditions of one output connected to one input and 10 outputs connected to one input. As stated previously, the total capacitance of one output line is approximately 33 picofarads. When ten such lines are bridged on one input line the total of 330 picofarads would be sufficient to change the frequency characteristic of the unit and in effect would lift frequencies about 5 megacycles because of the tuning effect which this total capacitance would have on the input strip line circuit. By placing the 220 ohm resistor (resistor 24) in series with each relay, damping is introduced in the circuit which spoils the Q at high frequencies thereby preventing a lift in frequency characteristic with consequent ringing at frequencies above the video band. Resistors 24 serve another very important purpose. When the switcher is used as a lap switcher, as is usually the case in television practice, the output line would automatically bridge two inputs together momentarily during the period of the lap which could cause serious transient effects if viewed on any other output circuit which might be connected to the input circuits in which switching is taking place. The 220 ohm resistors serve to isolate any two input lines from each other at the moment the overlap occurs. It will be seen that they would momentarily be connected through 2×220 or 440 ohms. Since the output impedance of each input amplifier is only of the order of 2 ohms the shunting effect during the overlap is negligible. In order to compensate for any slight dropoff of high frequencies caused by the presence of the 220 ohm resistors 24, a variable capacitor has been provided in the emitter circuit of the first transistor in the output amplifier. This is shown and labeled in FIGURE 6 and is used to compensate exactly the small deterioration of the frequency characteristic due to the presence of the 220 ohm resistors 24.

The described switcher may be used as a pre-set service unit in the studio or other complex in which case mechanically interlocking pushbuttons are used to control it. As stated above, a set of twenty-two such pushbuttons is mounted at each control station in order that the operator may be able to connect his output to any one of the twenty-two inputs simply by depressing one of the mechanically interlocking pushbuttons. Such operation automatically releases any other button which might be pressed previously. Another method of operating the switcher has been found useful where it is desired to use the unit as an "on-the-air" switcher. In this case momentary contact buttons are used and a bi-stable reed relay is interposed between the pushbuttons and the miniature video control relays in the switcher. Such bistable relays are connected in such a manner as to pull up and hold when a pushbutton is pressed momentarily. If another button on the same output line is pressed "on" in order to connect the output to a different source or input, its relay locks up and at the same time a current is sent to the unlatching winding of all the other bistable relays causing any relay which might previously have been latched up to release. With such operation the overlap time during a switch is approximately one millisecond. During this overlap period the output circuit in question is connected to two input lines. If they are carrying the same program, which is unlikely, there will be no change in video voltage at the output during the switching interval if the two inputs have the same voltage level. If the two inputs have the same synchronizing voltage level and are fed from a common synchronizing generator as is usually the case in a television complex but the pictures are different there will be no change in synchronizing voltage level during the overlap. The picture currents add in R.M.S. fashion during this one millisecond interval. As a practical matter it is impossible for a trained observer to see any transient during the time of the switch which is a highly desirable characteristic.

The foregoing description has related principally to a cross-bar switcher for use in a video application. However, it will be apparent that similar arrangements can be employed in other environments where selective connection between a plurality of inputs and a plurality of outputs is desired.

The above-described embodiment is illustrative of a preferred embodiment of the invention but is not intended to limit the possibilities of insuring the features of high speed, stable operation and increased reliability in performing switching functions. For example, a second switcher exactly like that just described may have its inputs connected to terminals 16 to thereby create a tandem arrangement having twenty-two inputs and twenty outputs.

What is claimed is:

1. In a video signal switching arrangement for selectively interconnecting any of a plurality of input sources to any of a plurality of outputs, the arrangement comprising:

a plurality of input lines to which said sources are connected;

an amplifier in each of said input lines;

a plurality of output lines oriented with respect to said input lines and spaced therefrom to define cross-over points between said input and output lines;

reed relays interconnecting said input and output lines at said cross-over points;

condenser means interposed in said input lines between the input amplifiers and the reed relays to prevent direct current signal components from passing to said relays;

a high impedance amplifier in each of said output lines, the output impedance of the input line amplifiers being negligible as compared with the input impedance of the amplifier in each output line to thereby permit a single input source to be simultaneously connected to a plurality of output lines without adverse signal level effects; and means for selectively closing said reed relays, said closing means including switches at each output corresponding to the number of input sources, each of said switches being connected to separate reed relays at the cross-over points between the input lines and the particular output line joined to said output to thereby permit any of said input sources to be selectively connected to said output upon actuation of the appropriate switch.

2. In a switching arrangement as set forth in claim 1, the arrangement further comprising:

resistor means in said output lines between each of the reed relays and its associated output amplifier.

3. In a switching arrangement as set forth in claim 1, the arrangement further comprising shielding means associated with each of said input and output lines to prevent cross-talk between said lines.

References Cited

UNITED STATES PATENTS

| | | | |
|---|---|---|---|
| 3,188,423 | 6/1965 | Glenner et al. | |
| 3,037,085 | 5/1962 | Lowry. | |
| 3,054,985 | 9/1962 | Mason | 340—166 |
| 3,174,009 | 3/1965 | Deeg. | |
| 3,307,148 | 2/1967 | Fukamachi | 340—166 |
| 3,348,075 | 10/1967 | Wagar. | |
| 3,373,406 | 3/1968 | Cannon et al. | 340—166 |

JOHN W. CALDWELL, Primary Examiner

HAROLD I. PITTS, Assistant Examiner

U.S. Cl. X.R.

179—18; 317—99, 137; 340—324